United States Patent
Oda et al.

(10) Patent No.: US 9,985,297 B2
(45) Date of Patent: May 29, 2018

(54) DURABILITY TEST DEVICE OF MEMBRANE ELECTRODE ASSEMBLY AND DURABILITY TEST METHOD THEREOF

(71) Applicant: Toyota Jidosha Kabushiki Kaisha, Toyota-shi, Aichi-ken (JP)

(72) Inventors: Tohru Oda, Toyota (JP); Katsuhiko Kinoshita, Nisshin (JP); Tatsuya Kawahara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 529 days.

(21) Appl. No.: 14/518,398

(22) Filed: Oct. 20, 2014

(65) Prior Publication Data

US 2015/0114849 A1   Apr. 30, 2015

(30) Foreign Application Priority Data

Oct. 25, 2013   (JP) .................................. 2013-222075

(51) Int. Cl.
*H01M 6/50* (2006.01)
*H01M 8/1018* (2016.01)
*H01M 8/1004* (2016.01)

(52) U.S. Cl.
CPC ........ *H01M 6/5083* (2013.01); *H01M 8/1004* (2013.01); *H01M 2008/1095* (2013.01)

(58) Field of Classification Search
CPC .................... H01M 6/5083; H01M 8/10–8/102
See application file for complete search history.

(56) References Cited

U.S. PATENT DOCUMENTS

| | | | |
|---|---|---|---|
| 2002/0071980 A1* | 6/2002 | Tabata | H01M 4/8605 429/480 |
| 2006/0051628 A1* | 3/2006 | Lim | H01M 8/04559 429/431 |
| 2006/0154119 A1* | 7/2006 | Kumar, Sr. | H01M 8/04082 429/429 |
| 2008/0042654 A1 | 2/2008 | Kato | |

FOREIGN PATENT DOCUMENTS

| | | | |
|---|---|---|---|
| JP | 08222260 A | * | 8/1996 |
| JP | 2006-120545 A | | 5/2006 |
| JP | 2008-010367 A | | 1/2008 |
| JP | 2011243315 A | * | 12/2011 |

* cited by examiner

*Primary Examiner* — Maris R Kessel
(74) *Attorney, Agent, or Firm* — Dinsmore & Shohl LLP

(57) ABSTRACT

A durability test device that examines durability of a membrane electrode assembly used for a polymer electrolyte fuel cell includes: a voltage application device that applies a voltage from one surface of the membrane electrode assembly to the other surface thereof; a current measurement device that measures a current flowing from the one surface to the other surface by the application of the voltage; and a control section that controls the voltage application device to apply the voltage to the membrane electrode assembly while sweeping the voltage over a plurality of consecutive voltage regions in such a manner that a first sweep rate of the voltage to be applied in the first voltage region in which a measured current value includes a peak caused due to carbon oxidation is set lower than that in the second voltage region that does not include the first voltage region.

4 Claims, 4 Drawing Sheets

DURABILITY TEST DEVICE OF MEMBRANE ELECTRODE ASSEMBLY AND DURABILITY TEST METHOD THEREOF

INCORPORATION BY REFERENCE

The disclosure of Japanese Patent Application No. 2013-222075 filed on Oct. 25, 2013 including the specification, drawings and abstract is incorporated herein by reference in its entirety.

BACKGROUND OF THE INVENTION

1. Field of the Invention

The present invention relates to a technique to examine durability of a membrane electrode assembly used for a polymer electrolyte fuel cell.

2. Description of Related Art

As a method for examining durability of a polymer electrolyte fuel cell, there has been known a technique described in Japanese Patent Application Publication No. 2006-120545 (JP 2006-120545 A), for example. JP 2006-120545 A describes a method for evaluating accelerated deterioration of an electrolyte membrane. In the evaluation method, an electrolyte membrane is provided in a container in which an aqueous electrolyte is poured, as a diaphragm that divides the aqueous electrolyte into two, and a positive electrode is provided in one of them and a negative electrode is provided in the other one of them. A given voltage is applied between the positive electrode and the negative electrode, and a current flowing between the positive electrode and the negative electrode is measured. Hereby, a deterioration of the electrolyte membrane is evaluated based on an increase in the current thus measured.

In the meantime, as a durability test method of a membrane electrode assembly (hereinafter also referred to as MEA) constituted by an electrolyte membrane, a catalyst electrode layer, and a gas diffusion layer, it is also possible to use such a test method in which a given voltage is applied to a membrane electrode assembly MEA like JP 2006-120545 A and its durability is examined. However, in consideration of such a case where the MEA as a test object is used as a product after the durability test, if a test period is long, the MEA may be damaged, which would be a problem. Further, in consideration of mass production of the membrane electrode assembly MEA, if a test period is long, productive efficiency decreases, which would be a problem.

Further, there has been known such a durability test method in which a voltage is applied to an MEA while the voltage is swept, and a current flowing in the MEA is examined. In this test method, a peak (hereinafter also referred to as a carbon oxidation peak) of a current caused along with oxidation of a catalyst carrying carbon included in a catalyst electrode layer appears in a measured current curve. In order to distinguish the carbon oxidation peak and a current flowing at the time when dielectric breakdown occurs in the MEA, a current value should be measured within a range including the carbon oxidation peak. On the other hand, the following fact is found by experiments that in a case where a sweep time of a voltage to be applied is shortened in consideration of a case where the MEA as a test object is used as a product after the durability test, a current value of the carbon oxidation peak increases. In a durability test with a shortened sweep time of a voltage, a current of the carbon oxidation peak at the time when the sweep time of the voltage to be applied is shortened is large, and a current flowing at the when dielectric breakdown occurs in the MEA is also large. In such a durability test, when a large current value is detected, it is necessary to determine whether a phenomenon due to the current is caused due to the dielectric breakdown of the MEA or caused due to the carbon oxidation peak. Accordingly, it is necessary to measure the current at least in the range including the carbon oxidation peak. However, in order to measure such a large current value due to the carbon oxidation peak, test facility is upsized and a cost is increased, which would be a problem.

SUMMARY OF THE INVENTION

A first aspect of the invention relates to a durability test device that examines durability of a membrane electrode assembly used for a polymer electrolyte fuel cell. The durability test device includes: a voltage application device that applies a voltage from one surface of the membrane electrode assembly to the other surface of the membrane electrode assembly; a current measurement device that measures a current flowing from the one surface to the other surface due to an application of the voltage; and a control section that controls the voltage application device to apply the voltage to the membrane electrode assembly while sweeping the voltage over a plurality of consecutive voltage regions including a first voltage region and a second voltage region in such a manner that a first sweep rate of the voltage to be applied in the first voltage region in which the measured current value includes a peak caused due to carbon oxidation is set lower than a second sweep rate of the voltage in the second voltage region that does not include the first voltage region.

According to the durability test device, since the first sweep rate of the voltage to be applied in the first voltage region that includes the peak caused due to carbon oxidation is set lower than the second sweep rate in the second voltage region, it is possible to decrease a peak value of the current caused due to the carbon oxidation in comparison with a case where the voltage is applied in the first voltage region at the same sweep rate as the second voltage region that does not include the first voltage region. Note that, when the second sweep rate of the voltage in the second voltage region is set faster than the first sweep rate in the first voltage region, it is possible to shorten a test period. Accordingly, it is possible to shorten the test period and to lower the peak value of the current due to the carbon oxidation.

The measured current value in the second voltage region includes a peak caused due to electrolysis of water.

A current flowing due to electrolysis of water is smaller than the peak value of the current caused due to the carbon oxidation. Accordingly, even if the second sweep rate in the second voltage region that includes the peak caused due to electrolysis of water is set higher than that of the first voltage region, the peak value of the current caused due to electrolysis is measurable. According to the durability test device, since the second sweep rate of the voltage in the second voltage region is set higher than that of the first voltage region, it is possible to shorten the test period.

The plurality of voltage regions may comprise by, in ascending order of the voltage, a second voltage region in which the measured current value includes a peak caused due to electrolysis of water, the first voltage region, and a third voltage region in which the voltage is larger than that of the first voltage region.

According to the durability test device, since the sweep rates of the voltage in the second and third voltage regions is set higher than that of the first voltage region, it is possible to shorten the test period.

The first voltage region may include a region in which the voltage is larger than 2 V but smaller than 3 V.

The peak value of the current caused due to the carbon oxidation appears in the voltage region where the applied voltage is larger than 2 V but smaller than 3 V. According to the durability test device configured as such, it is possible to lower the peak value of the current caused due to the carbon oxidation.

A second aspect of the present invention relates to a durability test method that examines durability of a membrane electrode assembly used for a polymer electrolyte fuel cell. The durability test method includes: measuring a current flowing from one surface of the membrane electrode assembly to the other surface of the membrane electrode assembly by applying a voltage from the one surface of the membrane electrode assembly to the other surface of the membrane electrode assembly while sweeping the voltage over a plurality of consecutive voltage regions including a first voltage region and a second voltage region; and examining the durability of the membrane electrode assembly based on the measured current. A first sweep rate of the voltage to be applied in the first voltage region in which the measured current includes a peak caused due to carbon oxidation is set lower than a second weep rate of the voltage in the second voltage region that does not include the first voltage region.

According to the durability test method, since the first sweep rate of the voltage to be applied in the first voltage region that includes the peak caused due to carbon oxidation is set lower than the second sweep rate of the voltage in the second voltage region, it is possible to decrease the peak value of the current caused due to the carbon oxidation in comparison with a case where the voltage is applied in the first voltage region at the same sweep rate as the second voltage region that does not the first voltage region. Note that, when the second sweep rate of the voltage in the second voltage region is set faster than the sweep rate in the first voltage region, it is possible to shorten a test period. Accordingly, it is possible to shorten the test period and to lower the peak value of the current caused due to the carbon oxidation.

According to such aspects, it is possible to achieve at least one of various objects of cost reduction, resource saving, simplification of manufacture, improvement in performance, and the like.

Note that the present invention can be realized in various aspects. For example, the present invention can be realized in various aspects of a durability test system of a fuel cell, a quality evaluation device, a quality evaluation method, and the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
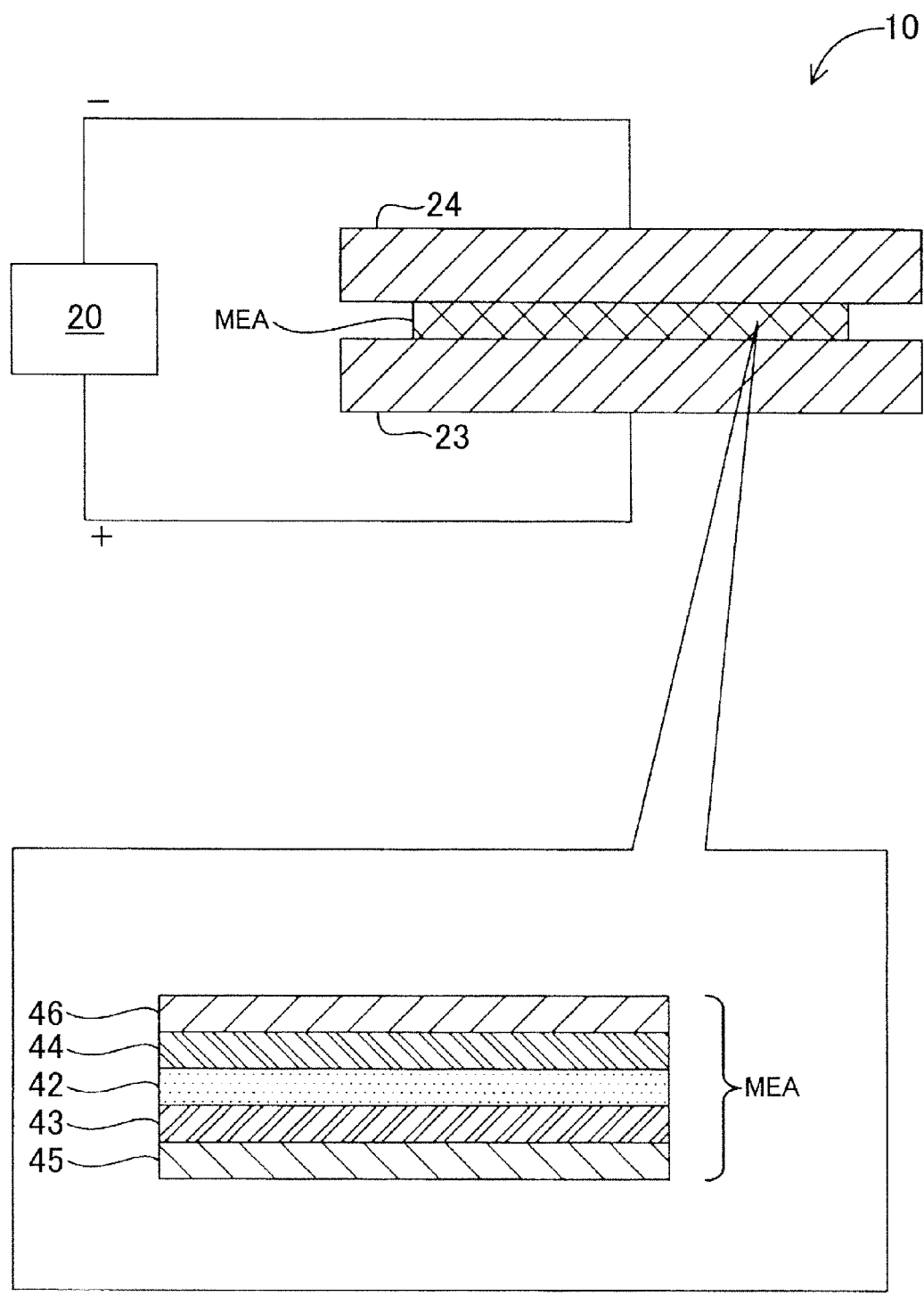
FIG. 1 is a schematic view illustrating a configuration of a durability test device 10.

A. First Embodiment:

(A1) Durability Test Device: FIG. 1 is a schematic view illustrating a configuration of a durability test device 10 as a first embodiment of the present invention. The durability test device 10 is a device for examining durability of a membrane electrode assembly MEA used for a fuel cell by applying a voltage to the membrane electrode assembly MEA while sweeping the voltage in a predetermined voltage region.

The durability test device 10 includes a measurement control section 20, a positive electrode 23, and a negative electrode 24. The positive electrode 23 and the negative electrode 24 are electrically connected to the measurement control section 20. The measurement control section 20 applies a voltage between the positive electrode 23 and the negative electrode 24, and measures a current flowing between the electrodes. The measurement control section 20 can sweep a voltage to be applied between the electrodes in a predetermined voltage region. Further, the measurement control section 20 measures a current flowing to the membrane electrode assembly MEA at the time when the voltage is swept, and displays a current value thus measured on a display (not shown) in a visible manner.

The membrane electrode assembly MEA as a test object of a durability test is provided between the positive electrode 23 and the negative electrode 24. The membrane electrode assembly MEA includes an electrolyte membrane 42 as illustrated in the figure. A catalyst electrode 43 as an anode is formed on one surface of the electrolyte membrane 42. A catalyst electrode 44 as a cathode is formed on the other surface of the electrolyte membrane 42. A gas diffusion layer 45 and a gas diffusion layer 46 are formed on respective outer surfaces of the catalyst electrode 43 and the catalyst electrode 44.

The electrolyte membrane 42 is a proton conducting ion-exchange membrane made of a solid polymeric material, e.g., fluorinated resin, and indicates a good electric conductivity in a wet condition. In the present embodiment, Nafion (registered trademark), which is a perfluorosulfonic acid membrane, is used as the electrolyte membrane 42.

The catalyst electrode 43 and the catalyst electrode 44 are each formed such that a catalyst ink containing a catalyst promoting an electrochemical reaction is applied on the electrolyte membrane 42, and then dried for a predetermined time so as to become a catalytic layer. In the present embodiment, the catalyst ink used herein is obtained by mixing a platinum carrying carbon as a catalyst carrying carbon and an ionomer with a predetermined solvent. In the present embodiment, the catalytic layer is formed by applying the catalyst ink to the electrolyte membrane 42, but the catalytic layer may be formed by applying the catalyst ink to a predetermined base material, and the catalytic layer thus formed may be placed on the electrolyte membrane 42.

The gas diffusion layer 45 and the gas diffusion layer 46 are each constituted by a member having a permeability to gases and an electrical conductivity. In the present embodiment, the gas diffusion layer 45, 46 are each made of a carbon porous member such as carbon cloth or carbon paper. By providing the gas diffusion layers 45, 46, it is possible to improve gas supply efficiency to the catalyst electrodes 43, 44 at the time when the membrane electrode assembly MEA is used in a fuel cell. Note that, in the present embodiment, a durability test of the membrane electrode assembly MEA is performed with the use of the durability test device 10 under an environment with a room temperature of 25±3° C. and a humidity of 50±10%. The configuration of the durability test device 10 is described as above.

Figure 2:
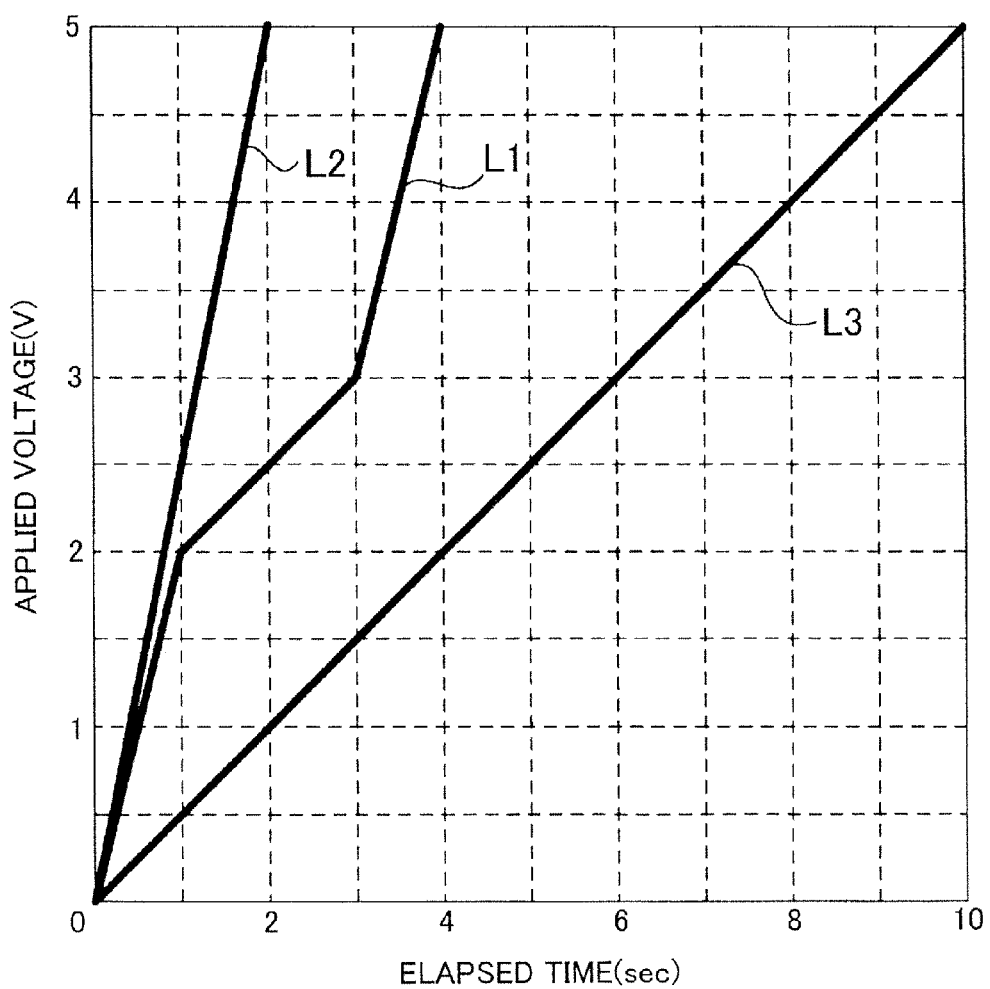
FIG. 2 is a graph illustrating a sweep method of an applied voltage.

(A2) Test Method: FIG. 2 is a graph showing an applied-voltage sweep method when a voltage is applied to a membrane electrode assembly MEA by use of the durability test device 10. In the present embodiment, an applied voltage is swept by a first sweep method shown by a graph L1 so as to examine a durability of a membrane electrode assembly MEA. Further, as comparative examples, durabilities of membrane electrode assemblies MEA are also examined by a second sweep method shown by a graph L2 and by a third sweep method shown by a graph L3.

As shown by the graph L1 in FIG. 2, the first sweep method is as follows: a sweep rate is 2 V/sec in a voltage region in which an applied voltage is 0 V to 2 V, the sweep rate is 0.5 V/sec in a voltage region in which the applied voltage is 2 V to 3 V, and the sweep rate is 2 V/sec in a voltage region in which the applied voltage is 3 V to 5 V. In the first sweep method, the sweep rate of the applied voltage in the voltage region of 2 V to 3 V is lower than the sweep rates in the other voltage regions (0 V to 2 V, 3 V to 5 V). As can be seen from FIG. 2, when the durability test of the membrane electrode assembly MEA is performed by use of the first sweep method, it takes four seconds to perform the test.

As shown by the graph L2 of FIG. 2, the second sweep method is as follows: a sweep rate is 2.5 V/sec in a voltage region in which an applied voltage is 0 V to 5 V. When the durability test of the membrane electrode assembly MEA is performed by use of the second sweep method, it takes two seconds to perform the test.

As shown by the graph L3 of FIG. 2, the third sweep method is as follows: a sweep rate is 0.5 V/sec in a voltage region in which an applied voltage is 0 V to 5 V. When the durability test of the membrane electrode assembly MEA is performed by use of the third sweep method, it takes ten seconds to perform the test.

Figure 3:
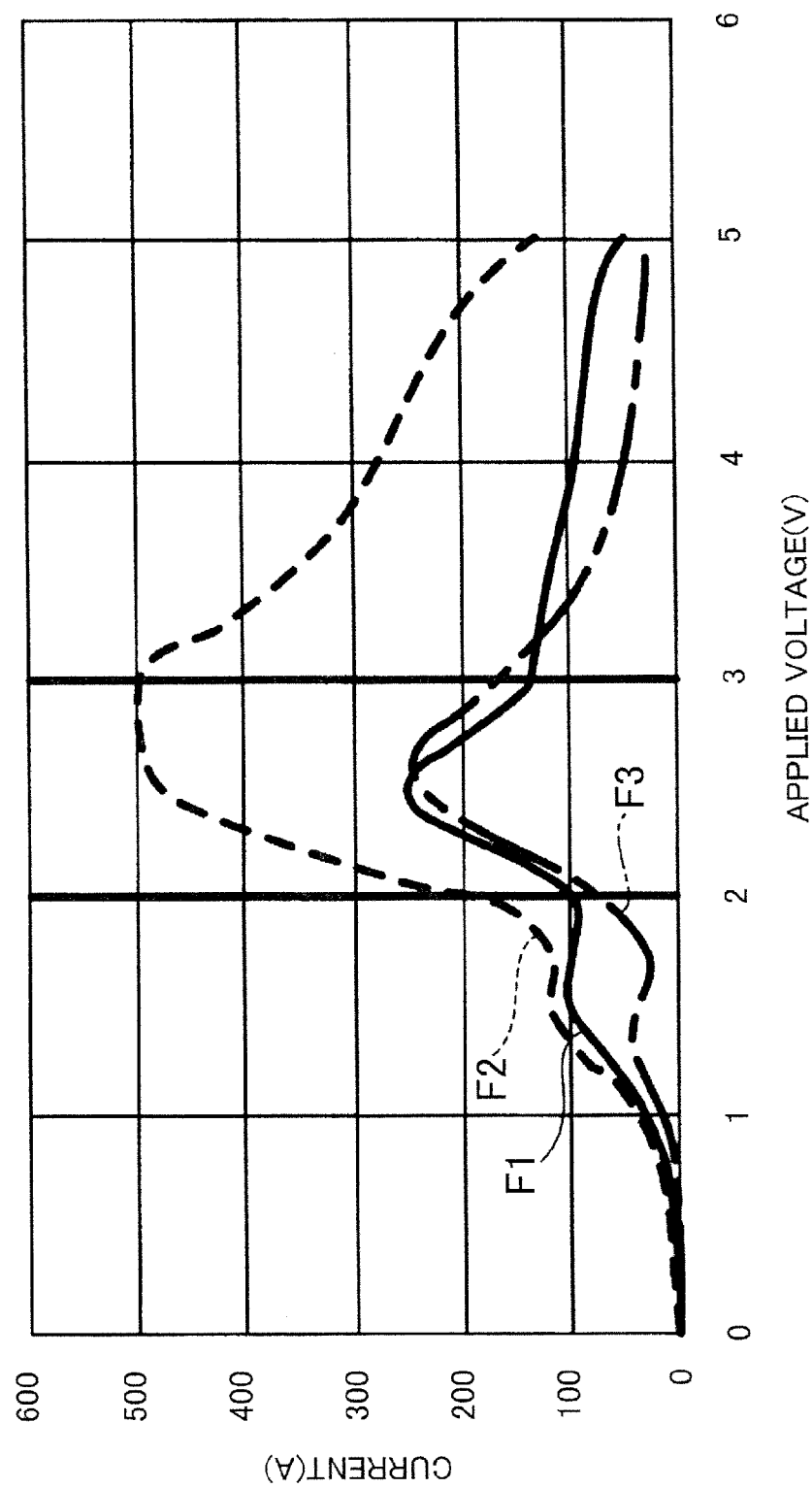
FIG. 3 is a graph illustrating a current value flowing in a membrane electrode assembly MEA.

FIG. 3 is a graph illustrating a current value flowing in the membrane electrode assembly MEA due to the durability test. A graph F1 shows a current measured by the durability test device 10 when a voltage is applied to the membrane electrode assembly MEA by the first sweep method as the present embodiment. A graph F2 is a current measured by the durability test device 10 when a voltage is applied to the membrane electrode assembly MEA by the second sweep method. A graph F3 is a current measured by the durability test device 10 when a voltage is applied by the third sweep method. Note that test results shown by the graphs F1 to F3 show that the durabilities of the membrane electrode assemblies MEA satisfy the standard. In a case where the durability test is performed by use of a membrane electrode assembly MEA of which a durability does not satisfy the standard, while an applied voltage is swept, dielectric breakdown occurs in the membrane electrode assembly MEA and a heavy-current flows, thereby resulting in that a prominent current value appears in a graph of a measured current.

In each of the graphs F1 to F3, a small current peak that appears in the voltage region in which the applied voltage is 0 V to 2 V is a current peak caused due to electrolysis of water included in the membrane electrode assembly MEA. In each of the graphs F1 to F3, a large current peak that appears in the voltage region in which the applied voltage is 2 V to 3 V is a carbon oxidation peak of the catalyst carrying carbons included in the catalyst electrodes 43, 44.

It is found from experiments that a value of a carbon oxidation peak to be measured becomes larger as a sweep rate of an applied voltage is faster. In the durability test by the first sweep method as the present embodiment, in the voltage region of 2 V to 3 V in which the carbon oxidation peak appears, the sweep rate is set lower than those in the other voltage regions. In the first sweep method, the sweep rate in the voltage region of 2 V to 3 V is the same sweep rate as in the comparative example 3. As a result, a current value of the carbon oxidation peak in the first sweep method is smaller than that of the comparative example 2, similarly to a current value of the carbon oxidation peak in the third sweep method.

Figure 4:
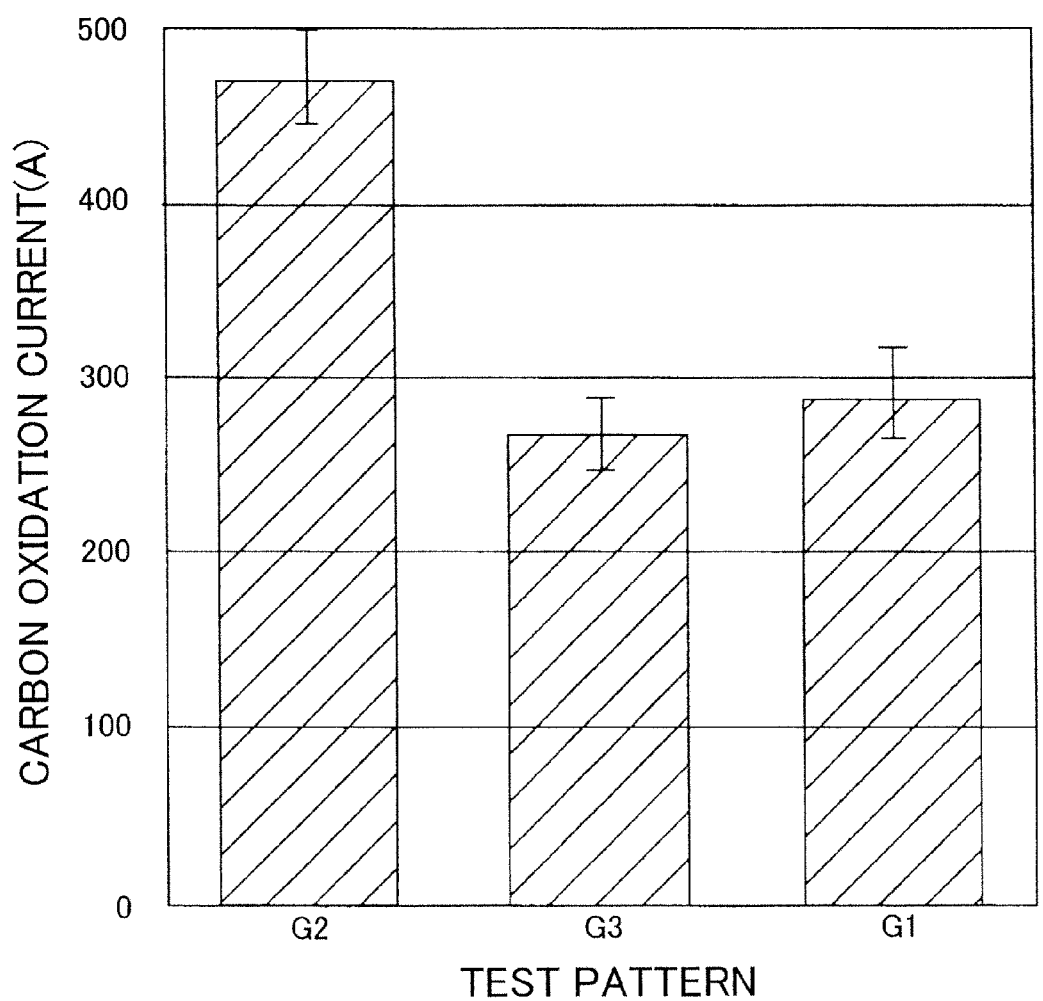
FIG. 4 is a graph to compare current values of carbon oxidation peaks.

FIG. 4 is a graph to compare the current values of the carbon oxidation peaks measured in the first to third sweep methods. The carbon oxidation peak was measured several times by each of the sweep methods, and peak values were evaluated by 3σ (σ: a standard deviation).

A graph G1 in FIG. 4 indicates the carbon oxidation peak measured by the first sweep method. A graph G2 indicates the carbon oxidation peak measured by the second sweep method. A graph G3 indicates the carbon oxidation peak measured by the third sweep method. A peak value of the carbon oxidation peak by the first sweep method can be restrained to be smaller than that of the carbon oxidation peak by the second sweep method, because the sweep rate of the applied voltage is set lower in the voltage region of 2 V to 3 V in which the carbon oxidation peak appears.

(A3) Effect: As described above, according to the durability test of the membrane electrode assembly MEA by the first sweep method as the present embodiment, since the sweep rate of the applied voltage in the voltage region of 2 V to 3 V where the carbon oxidation peak is included is set lower than the sweep rates in the other voltage regions (0 V to 2 V, 3 V to 5 V), it is possible to decrease the peak value of the carbon oxidation peak in comparison with a case where the voltage is applied in the voltage region of 2 V to 3 V at the same sweep rate as the other voltage regions. Accordingly, in comparison with a case where the value of the carbon oxidation peak is large, it is possible to decrease a current value that should be measured, thereby making it possible to achieve simplification, downsizing, and cost reduction of the configuration of the durability test device 10.

In the durability test by the first sweep method as the present embodiment, the sweep rates of the voltage are set faster in the voltage regions of 0 V to 2 V and of 3 V to 5 V than that in the voltage region of 2 V to 3 V. Accordingly, in comparison with a case where the voltage is swept in the voltage region of 2 V to 3 V at the same sweep rate as in the voltage regions of 0 V to 2 V and of 3 V to 5 V, it is possible to shorten a test period. As a result, according to the durability test of the membrane electrode assembly MEA by the first sweep method as the present embodiment, it is possible to shorten the test period and to lower the peak value of the current caused due to carbon oxidation. Since the test period can be shortened, it is possible to restrain damage to the membrane electrode assembly MEA due to the durability test as much as possible. Further, it is possible to examine many membrane electrode assemblies MEA in a short time, and thus, the test method by the first sweep method using the durability test device 10 is a test method suitable for mass production of the membrane electrode assembly MEA.

B. Modified Examples: Note that the present invention is not limited to the above embodiment, and is performable in various modified examples within a range that does not deviate from the gist of the present invention. For example, the following modified examples can be employed.

(B1) Modified Example 1: In the first sweep method as the above embodiment, the sweep rate shown by the graph L1 in FIG. 2 is used as the sweep rate, but various patterns of the sweep rate can be employed provided that the sweep rate is lower in the voltage region where the carbon oxidation peak is measured than the other voltage regions. For example, the sweep rate in a voltage region of 0 V to 1.5 V may be 2.5 V/sec, the sweep rate in a voltage region of 1.5 V to 4.0 V may be 0.3 V/sec, and the sweep rate in a voltage region of 4.0 V to 5.0 V may be 2.0 V/sec. Even in this case, it is possible to obtain the same effect as in the above embodiment.

(B2) Modified Example 2: In the above embodiment, the region (0 V to 5 V) of the voltage to be swept is divided into three regions (0 V to 2 V, 2 V to 3 V, 3 V to 5 V), but may be divided into two regions of 0 V to 3 V and of 3 V to 5 V such that the sweep rate in the voltage region of 0 V to 3 V is set lower than the sweep rate in the voltage region of 3 V to 5 V. Moreover, for example, the voltage region may be divided into two regions of 0 V to 2 V and of 2 V to 5 V such that the sweep rate in the voltage region of 2 V to 5 V is set lower than the sweep rate in the voltage region of 0 V to 2 V. Thus, it is possible to employ various forms as a division form of the region of the voltage to be swept as long as the sweep rate in the voltage region where the carbon oxidation peak is measured is set lower than that in the other voltage region.

What is claimed is:

1. A durability test device that examines durability of a membrane electrode assembly used for a polymer electrolyte fuel cell, the durability test device comprising:
   a voltage application device configured to apply a voltage from one surface of the membrane electrode assembly to the other surface of the membrane electrode assembly;
   a current measurement device configured to measure a current flowing from the one surface to the other surface due to an application of the voltage; and
   a control section programmed to control the voltage application device to apply the voltage to the membrane electrode assembly while sweeping the voltage over a plurality of consecutive voltage regions including a first voltage region and a second voltage region in such a manner that a first sweep rate of the voltage to be applied in the first voltage region in which the measured current value includes a peak caused due to carbon oxidation is set lower than a second sweep rate of the voltage in the second voltage region that does not include the first voltage region, wherein the first voltage region includes a region in which the voltage is larger than 2 V but smaller than 3 V.

2. The durability test device according to claim 1, wherein:
   the measured current value in the second voltage region includes a peak caused due to electrolysis of water.

3. The durability test device according to claim 1, wherein:
   the plurality of voltage regions comprises, in ascending order of the voltage, the second voltage region in which the measured current value includes a peak caused due to electrolysis of water, the first voltage region, and a third voltage region in which the voltage is larger than the voltage of the first voltage region.

4. A durability test method that examines durability of a membrane electrode assembly used for a polymer electrolyte fuel cell, the durability test method comprising:
   applying a voltage from one surface of the membrane electrode assembly to an other surface of the membrane electrode assembly while sweeping the voltage over a plurality of consecutive voltage regions including a first voltage region and a second voltage region;
   measuring a current flowing from the one surface of the membrane electrode assembly to the other surface of the membrane electrode assembly due to the applying of the voltage; and
   examining the durability of the membrane electrode assembly based on the measured current, wherein:
   a first sweep rate of the voltage to be applied in the first voltage region in which the measured current includes a peak caused due to carbon oxidation is set lower than a second sweep rate of the voltage in the second voltage region that does not include the first voltage region, wherein the first voltage region includes a region in which the voltage is larger than 2V but smaller than 3V.

* * * * *